US007748584B2

(12) United States Patent
Easom

(10) Patent No.: US 7,748,584 B2
(45) Date of Patent: Jul. 6, 2010

(54) ACCESSORY HOLDER

(76) Inventor: Deborah K. Easom, 2319 E. Spanish Ct., Granbury, TX (US) 76048

( * ) Notice: Subject to any disclaimer, the term of this patent is extended or adjusted under 35 U.S.C. 154(b) by 413 days.

(21) Appl. No.: 11/505,020

(22) Filed: Aug. 15, 2006

(65) Prior Publication Data

US 2007/0045367 A1 Mar. 1, 2007

Related U.S. Application Data

(60) Provisional application No. 60/596,135, filed on Sep. 1, 2005, provisional application No. 60/596,174, filed on Sep. 6, 2005, provisional application No. 60/596,310, filed on Sep. 14, 2005.

(51) Int. Cl.
*B60R 11/00* (2006.01)

(52) U.S. Cl. ...................................... 224/401; 224/563

(58) Field of Classification Search ................. 224/401, 224/563, 600; 383/22, 16
See application file for complete search history.

(56) References Cited

U.S. PATENT DOCUMENTS 2,171,676 A * 9/1939 Wallace ........................... 2/48
2,767,895 A * 10/1956 Smith ......................... 224/275
3,876,126 A * 4/1975 Kearney ..................... 224/401
4,830,238 A * 5/1989 Widinski et al. ............ 224/572
4,953,765 A * 9/1990 Little et al. ................. 224/583
5,154,331 A * 10/1992 Sanders ...................... 224/407
5,326,175 A * 7/1994 Carter ......................... 383/22
5,341,933 A * 8/1994 Willows ..................... 206/554
5,341,975 A * 8/1994 Marinescu .................. 224/666
D352,260 S * 11/1994 Adamo ...................... D12/133
5,743,650 A * 4/1998 Shannon et al. ............... 383/16
5,823,594 A * 10/1998 Hayes et al. ................ 294/142
5,836,497 A * 11/1998 Pelish ........................ 224/677
5,941,437 A * 8/1999 Okumura .................... 224/585
6,029,841 A * 2/2000 Fotherby et al. ......... 220/23.87
6,086,253 A * 7/2000 Hartsfield .................... 383/22
7,438,194 B2 * 10/2008 Wang ......................... 211/113
2002/0139036 A1 * 10/2002 Smith ......................... 43/21.2
2003/0089749 A1 * 5/2003 Valdez-Campbell ........ 224/153
2007/0039986 A1 * 2/2007 Tomasi ....................... 224/401

* cited by examiner

*Primary Examiner*—Nathan J Newhouse
*Assistant Examiner*—Lester L Vanterpool
(74) *Attorney, Agent, or Firm*—Lynn E. Barber

(57) ABSTRACT

An accessory holder for a lawn mower having accessory pockets on one side of the holder and a large pocket on the other side of the holder. Each of the accessory pockets has an upper opening for insertion of an accessory and a gathered lower opening that is smaller than the upper opening. The accessory holder may also be hung on a wall.

5 Claims, 6 Drawing Sheets

ACCESSORY HOLDER

CROSS-REFERENCE TO RELATED APPLICATIONS

This application claims priority from U.S. provisional application Ser. Nos. 60/596,135, filed Sep. 1, 2005; 60/596,174, filed Sep. 6, 2005, 60/596,310, filed Sep. 14, 2005, the disclosures of which are incorporated herein by reference.

BACKGROUND OF THE INVENTION

1. Field of the Invention

This invention relates to holder of accessory items that may be hung on a support, and preferably relates to an accessory holder that may be attached to a lawnmower.

2. Description of the Related Art

When a lawn mower is in use, the operator of the lawnmower often has the need for various useful items, herein called “accessories”, such as grass clippers, ant killer, weed killer, wasp spray, a bag to collect trash, a cloth to wipe the operator’s brow, bottled water or a soft-drink, and the like. In addition, the lawnmower operator may find it convenient to have a cell phone, iPod, or other electronic device within reaching distance. While one or a couple of these items may be carried in the operator’s pockets, there is a limit to the number and size of items that may be pocketed, and therefore, the operator is either forced to leave the mower to fetch the needed accessory or postpone, possibly indefinitely, the use of the accessory.

Lawnmower operators may attach a tote bag or other container such as a beverage container to the lawnmower; however, these containers are often unwieldy or unbalanced when attached and may interfere with mowing operations. It is important that any lawnmower attachment not interfere with the propulsion lever of self-propelled mowers or with other lawnmower operating equipment. Prior containers are also often limited in their function to the particular accessory(ies) for which they are designed.

Containers or other holders attached to lawnmowers also can become dirtied and unsightly after use, and during the mowing process can gradually fill with airborne lawn clippings, dirt, or other debris. Such debris is often difficult to remove from such containers, particularly if the container is deep and narrow, such as those designed for holding cans or bottles.

If the lawnmower is operated when the grass is wet, or it begins to rain, containers made of fabric that are attached to the lawnmower can become waterlogged, and if not carefully dried, can become mildewed.

Generally therefore, operators of lawnmowers find it necessary to return to their garage or other storage facility whenever they need an accessory to attend to related lawn chores or to refresh themselves.

It is therefore an object of the invention to provide an accessory holder for a lawn mower that provides a plurality of pockets and may be used to carry diverse objects. It is a further object of this invention to provide an accessory holder that does not unbalance the lawnmower or interfere with lawnmower operation. It is also an object of this invention to provide an accessory holder that is easily cleaned and air-dried.

Other objects and advantages will be more fully apparent from the following disclosure and appended claims.

SUMMARY OF THE INVENTION

The invention herein is an accessory holder for a lawn mower and has accessory pockets on one side of the holder and a large pocket on the other side of the holder. Each of the accessory pockets has an upper opening for insertion of an accessory and a gathered lower opening that is smaller than the upper opening. The accessory holder may also be hung on a wall.

Other objects and features of the inventions will be more fully apparent from the following disclosure and appended claims.

DETAILED DESCRIPTION OF THE INVENTION AND PREFERRED EMBODIMENTS THEREOF

The present invention is an accessory holder having a plurality of pockets. In its preferred embodiment, the accessory holder of the invention may be used on a lawnmower. The preferred accessory holder of the invention may also be hung on a vertical surface, such as a garage wall, for storage of accessories, when not in use on the lawnmower. In other embodiments, sized to fit in particular environments, the accessory holder may be used for containing accessories used for other endeavors without departing from the invention herein.

Figure 1:
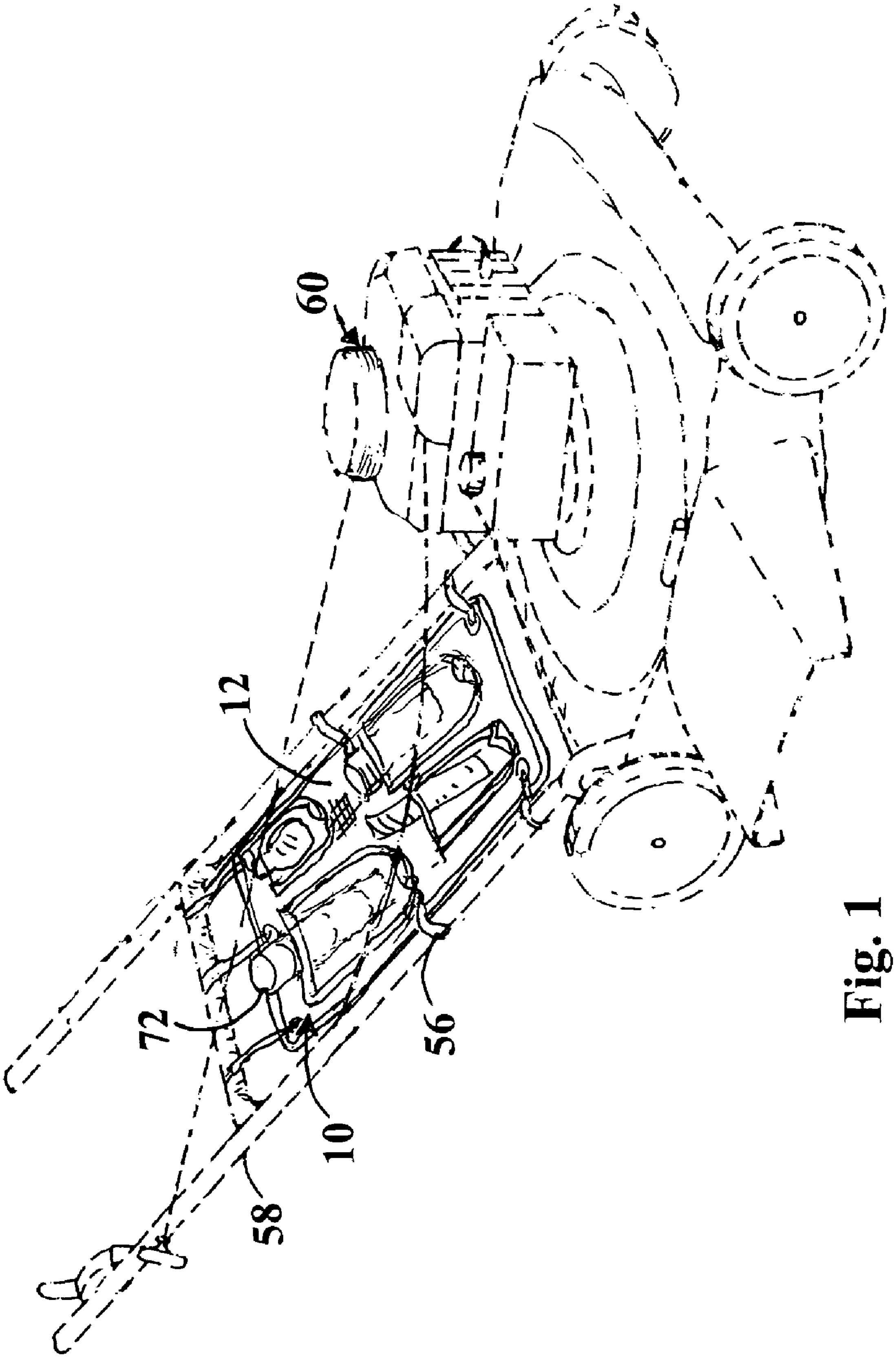
FIG. 1 is a perspective view of a lawnmower to which the accessory holder of the invention has been mounted.

Referring now to the figures, the accessory holder 10 of the invention is generally a flexible flat construct. The accessory holder 10 is preferably rectangular as shown in FIGS. 1-5 and of a size to fit between the parallel bars of a lawnmower below the cross-handlebar of the mower and above the gas tank and lawnmower itself, as shown in FIG. 1. For a standard lawnmower in which the handles are about 20 inches apart, an accessory holder 10 about 24 inches long×about 18 inches wide, or slightly smaller, is an appropriate size. Alternatively, the accessory holder 10 may be oval, elliptical or square and still provide sufficient space for a plurality of pockets and side edges for attachment to a lawnmower’s bars which extend from the handlebar down to the mower housing.

The accessory holder 10, and the pockets discussed in more detail below, are preferably made of a material that is water-resistant or waterproof. Preferably the material is woven or otherwise formed so that it has large enough gaps in the weave or pores in the material so that water that may adhere to or enter the pockets or land on the surface of the material will go through the material, and so that the accessory holder 10 may be sprayed or otherwise washed. While the body and pockets may be made of plastic, fabric, or other flexible material, the preferred material is thick nylon mesh (CFJ Manufacturing, Ft. Worth, Tex.). This material is a mesh that has openings that are sufficiently large that items inserted in the pockets may be seen through the pocket as shown in FIG. 1.

Figure 2:
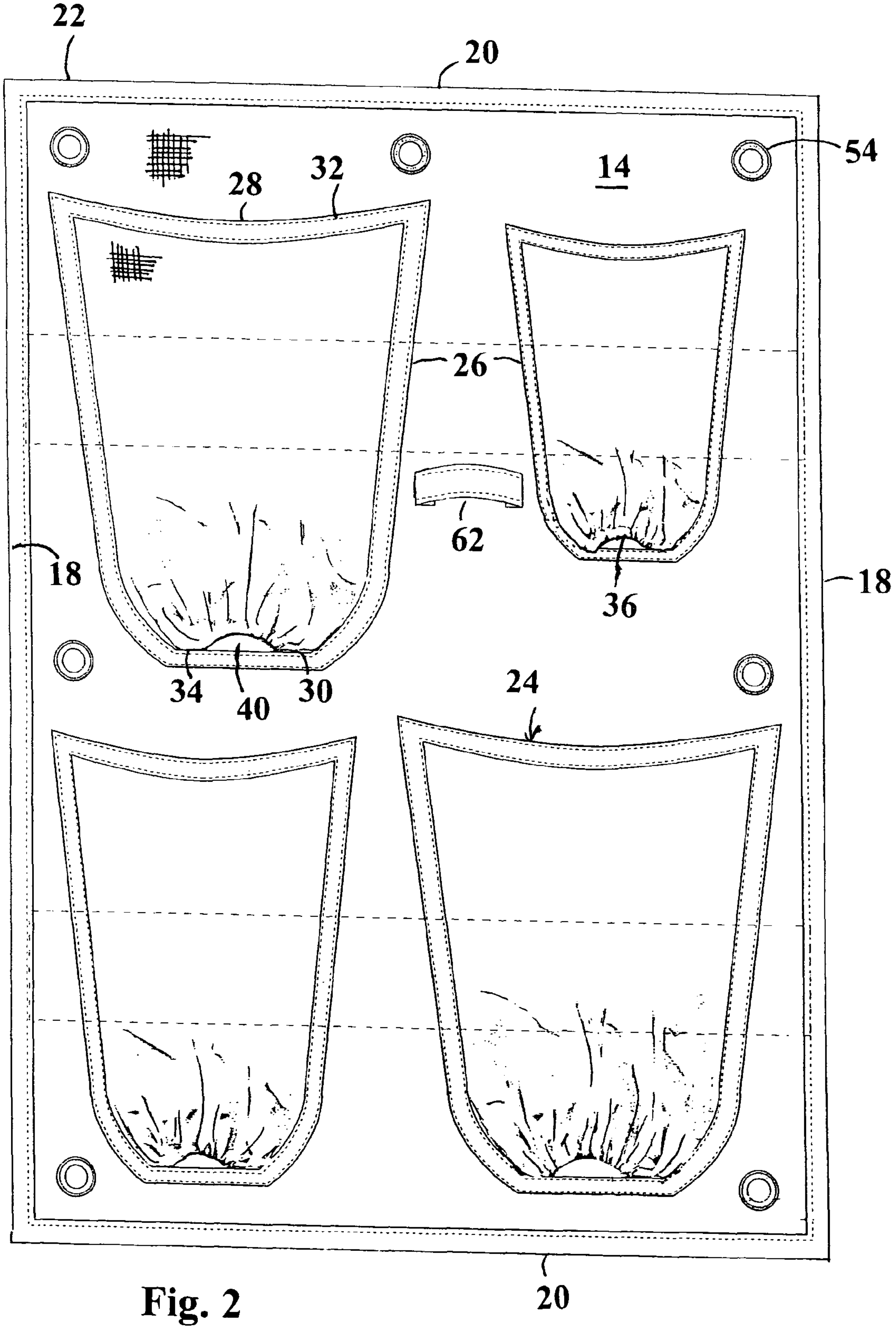
FIG. 2 is a planar view of the first planar surface of the preferred embodiment of the invention.

The accessory holder 10 preferably comprises a flexible body 12 formed of two separate, equal-sized pieces of material that when attached together have a first planar surface 14 (FIG. 2), a second planar surface 16 (FIG. 3), two side edges 18 and two end edges 20 at the upper and lower end edges of the body as shown in FIG. 2. Alternatively, the flexible body 12 may be a single strong piece of material having a first and second planar surface to which the pockets discussed herein are attached.

In the preferred embodiment, the various pockets as desired by the manufacturer are attached to the two separate pieces of material before assembly of the body. To hold the two separate planar surfaces together if used, and to provide clean edges to the body and to keep a woven body from unraveling at the edges, the edges are preferably bound by seam binding, seam tape or other binding material or other fabric edging materials 22 known in the art, attached to the body by sewing, by adhesive attachment or other known means.

Figure 7:
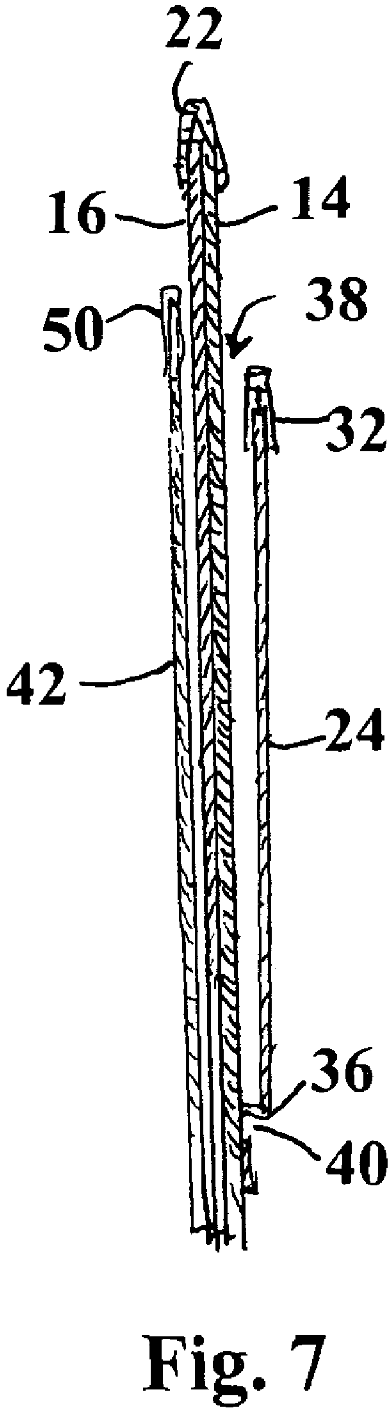
FIG. 7 is a cross-sectional view of the accessory holder through an accessory pocket and large pocket.

In the preferred embodiment, there are at least two accessory pocket pieces 24 attached to the first planar surface 14 to form accessory pockets (FIGS. 2 and 7). Most preferably there are four accessory pieces 24 on the first planar surface 14 as shown in FIGS. 1-2. Each of the accessory pocket pieces 24 preferably has a straight top 28, two straight sides 26 and a bottom 30, preferably being generally rectangular with a rounded or oval bottom, or rectangular with a slight narrowing at the bottom of the pocket piece. A piece of seam tape or seam binding 32 is used to bind the top of the pocket piece 24, and also to bind the sides 26 of the pocket and the outer portions 34 of the bottom 30 and to attach the sides 26 and outer portions 34 of the bottom to the first planar surface 14. Rather than bind the center bottom 36 of the pocket piece 24, however, the seam binding 26 at the bottom of the pocket piece 24 is just attached to the first planar surface 14 and is not attached to the center bottom 36 of the pocket piece 24. This forms a pocket that has an upper opening 38 for insertion of an accessory but preferably is not attached to the first planar surface at center 36 of the bottom of the pocket piece 24. Instead, at the area 40 below the pocket piece 24, the piece of seam binding continues on below the pocket piece 24 as shown in FIG. 2 between the outer portions 34 of the bottom of the pocket piece 24 but preferably is not attached to the center 36 of the bottom of the pocket piece 24 itself.

The center bottom 36 of each accessory pocket piece 24 that is not attached to the first planar surface 14 is preferably gathered as shown in FIG. 2 by a gathering stitch on an industrial sewing machine, or as otherwise known in the art. The upper opening 38 of the pocket and the lower opening are sized so that items (e.g., bottle or can or other item) that the lawnmower operator is likely to place in the pockets can be easily placed in the pocket but will not fall out of the pocket bottom, but the lower opening is large enough so that debris will not be retained in the pocket formed by the pocket piece 24.

Individual pocket sizes and shapes and bottom openings can be adjusted during manufacture for particular accessories, and may be completely enclosed on selected pockets, except for a top entry, if desired.

Figure 4:
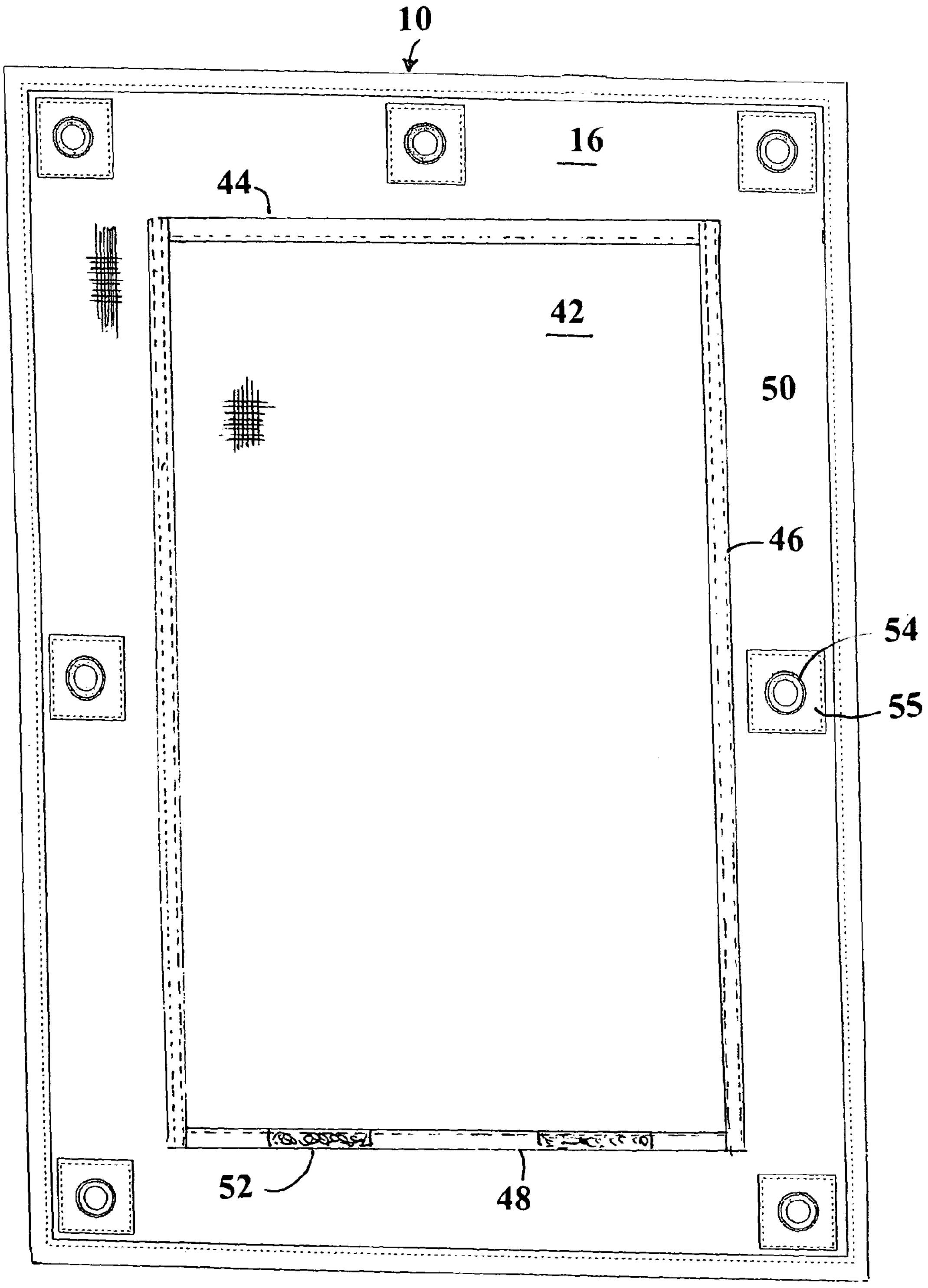
FIG. 4 is a planar view of the second planar surface of the preferred embodiment of the invention having a large pocket.
Figure 5:
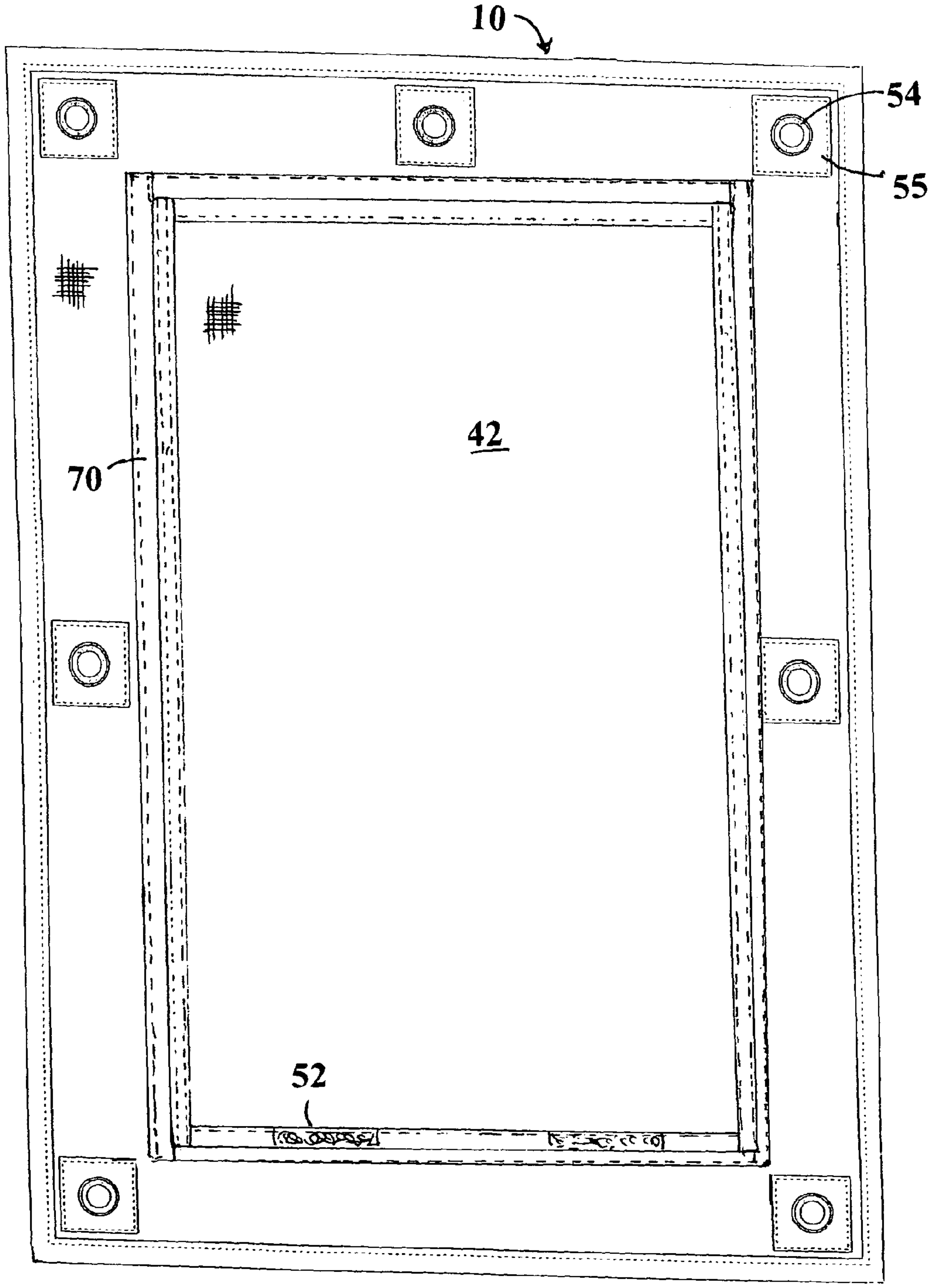
FIG. 5 is a planar view of the second planar surface of an alternative embodiment having a large pocket and having a second larger pocket in which a stiffening board may be inserted.
Figure 6:
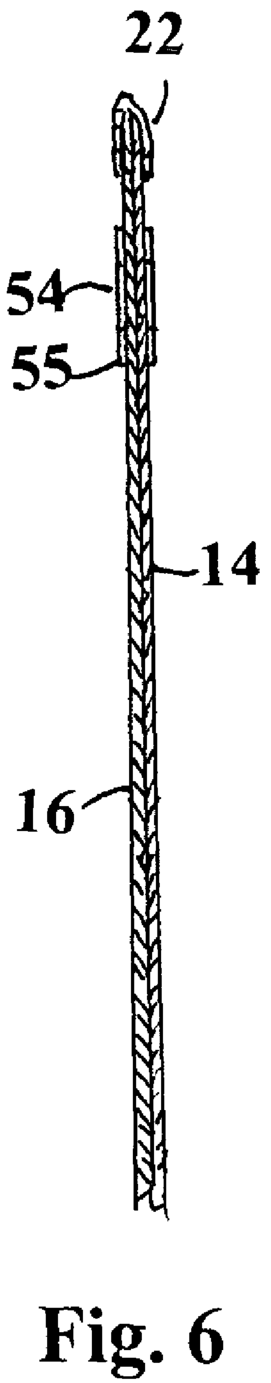
FIG. 6 is a cross-sectional view near the side of the accessory holder of the invention through a grommet.

On the second planar surface 16, at least one large pocket piece 42 having a top 44, two sides 46, and a bottom 48, is attached to form a large pocket with an upper opening (FIG. 4). To maximize its capacity, the large pocket piece 42 preferably is about 12-13 inches×19-20 inches for a standard accessory holder 10. As with the accessory pieces 24, a piece of seam tape 50 or other binding means is preferably used to bind the top 44, sides 46, and bottom 48 of the pocket, and the bound sides 46 of the large pocket piece 42 are then sewn or otherwise attached to the second planar surface 16. The edge of the bottom 48 of the large pocket piece 42 is preferably also bound before attachment of the large pocket piece to the second planar surface 16, but is not sewn or otherwise permanently attached thereto. Instead, preferably two or more short sections of hook and loop fastener 52 are used to releasably hold the bottom 48 of the large pocket piece 42 to the second planar surface 16, while allowing debris to escape from the large pocket formed by the large pocket piece 42 even when the hook and loop fastener is holding the bottom of the large pocket closed. While the location of hook and loop fastener is shown in FIGS. 4 and 5, it would not actually be able to be seen in these views, but is hidden beneath bottom 48 where bottom 48 is attached by the hook and loop fastener to second planar surface 16.

Once all of the pockets are attached to the first and second planar surfaces 14, 16 the pieces forming these surfaces are attached together, if the first and second planar surfaces are not opposite sides of the same piece of material, as discussed above.

The assembled accessory holder 10 also has attached thereto a means of attachment of the body to a support. In the preferred embodiment, the means of attachment comprises grommets 54, preferably three on each side edge 18 and one in the center of the top edge 20 as shown (FIGS. 1-6). The grommets 54 may be round or elliptical or other shape as known in the art. Reinforcing squares 55, preferably made of 1680 denier nylon, are used to mount the grommets 54 on the accessory holder 10, and are preferably on both surfaces of the accessory holder (but only shown in FIGS. 3-5). The operator may use plastic pull-ties or twisty-ties, strong wire, or metal strapping, or other attachment means 56, placed through the grommets 54 and around the side bars 58 of the mower 60.

Alternatively, or in addition to grommets, the means of attachment may comprise hook and loop fastening strips (e.g., 5×½-inch strips of VELCRO™) either just placed through the grommets 54 and fastened together around the bars of lawnmower, or attached to the sides of the accessory holder 10 by sewing or rivets, glue, or stick-on as is known in the art.

The accessory holder 10 preferably contains one or more loops 62 attached to one of the planar surfaces (example shown in FIG. 2). Each loop 62 is preferably constructed of the same material as the body and pockets, or may be made of elastic material or other sturdy material. In either case, the loops should be constructed of sufficiently strong material so that implements such as clippers or pruners and the like may be attached. Optionally, spring-loaded clips sewn or attached to the body or the pockets may be included for clipping such things as a hat or baseball cap into the clip.

Figure 3:
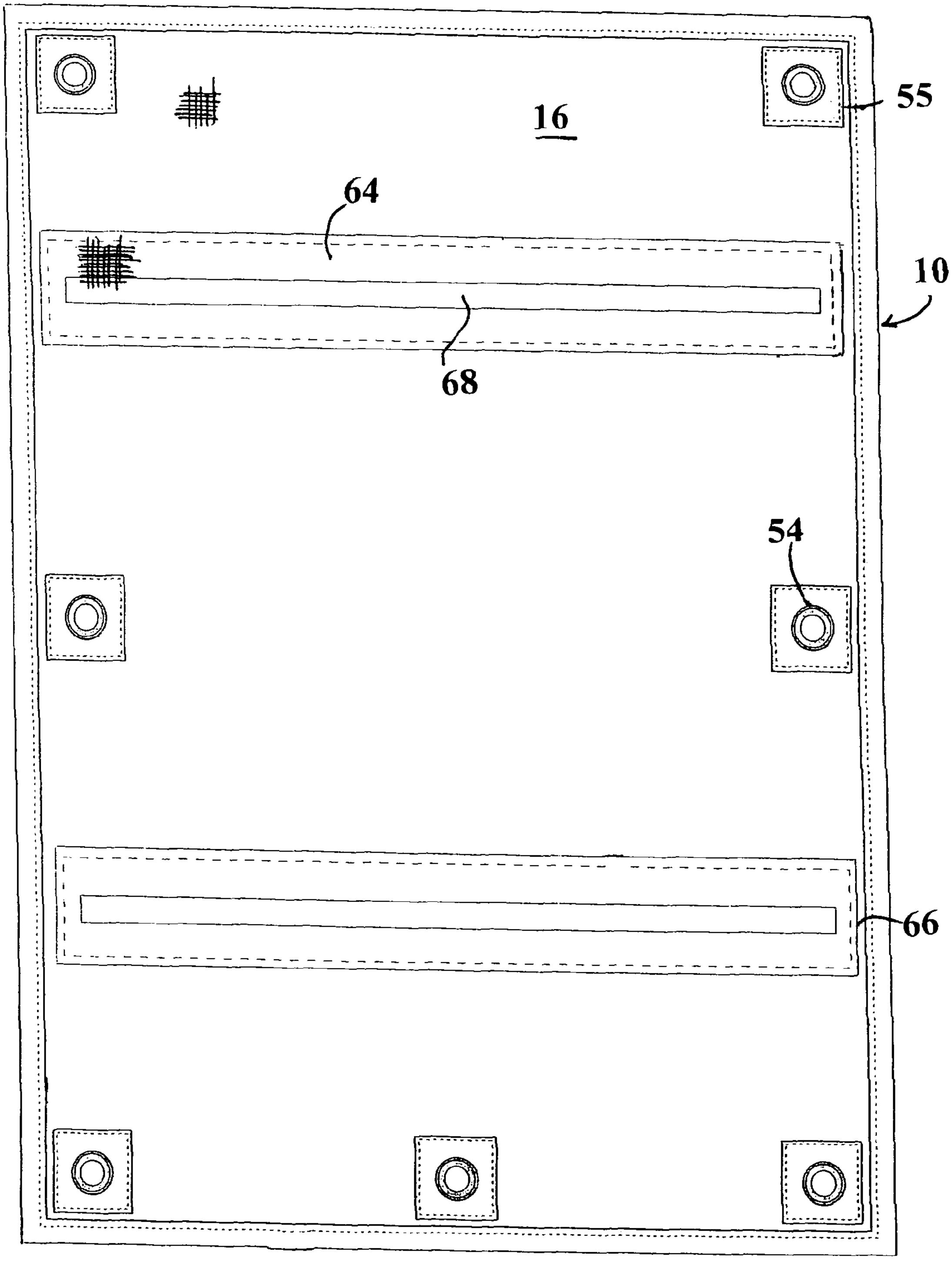
FIG. 3 is a planar view of the second planar surface of the preferred embodiment of the invention not having a large pocket, but having cross-pockets for insertion of stiffening rods.

Although the accessory holder 10 discussed above does not require further stiffening or strengthening for normal uses, optionally, cross-pockets 64 may be placed on the accessory holder 10 for insertion of a stiffening rod as shown in FIG. 3 on the second planar surface. These cross-pockets 64 are preferably made of the same material or a sturdy webbing of 1680 denier nylon, and are sewn to the second planar surface 16 before attachment of the large pocket piece 42. The cross-pockets 64 may be open at both ends 66 or at just one end for insertion of a dowel 68 or other sturdy elongated support piece.

An alternative strengthening means is a second large pocket 70 (FIG. 5) attached at its sides and bottom to the second planar surface 16 before attachment of the large pocket piece 42. Preferably if this second large pocket 70 is added, it would be attached to the large pocket used for garbage bags and then attached to the accessory holder 10. A stiffening board (not shown), such as pegboard or wallboard, may be placed in the second large pocket 70. This second large pocket may be used for other storage as well.

In use, the accessory holder 10 is firmly attached to the lawnmower 60 through the preferred three grommets on each side of the accessory holder 10 and the grommet at the upper edge of the accessory holder 10 (FIG. 1) as discussed above, with the plurality of pockets on the first planar surface being on the angled top of the accessory holder 10 so that the accessories 72 in the pockets are easily available for use by the operator. The operator thus places the items most likely to be needed in the mostly easily accessible pockets or attaches them to the loops or other fasteners. In many cases, the operator may thus reach the desired accessory with one hand without stopping the mower, keeping the mower running with the other hand that grasps the propulsion lever. Even if two hands are needed to use the accessory or if the operator needs to move away from the mower, such as to spray a weed killer, the operator does not need to return to the storage area or truck to be able to use the accessory. Garbage bags or larger items may be placed in the pocket formed by the large pocket piece 42.

While the invention has been described with reference to specific embodiments, it will be appreciated that numerous variations, modifications, and embodiments are possible, and accordingly, all such variations, modifications, and embodiments are to be regarded as being within the spirit and scope of the invention.

What is claimed is:

1. An accessory holder, comprising:

(a) a flexible body formed of a single piece of material having a first planar surface, a second planar surface, two side edges, an upper end edge and a lower end edge, or formed of two equal-sized pieces of material that are attached together to have a first planar surface, a second planar surface, two side edges, one upper end edge, and one lower end edge;

(b) a plurality of accessory pocket pieces, each of the pocket pieces being attached along pocket piece sides to the first planar surface to form a pocket that has:

i. an upper opening for insertion of an accessory; and ii. a gathered lower opening that is smaller than the upper opening;

(c) at least one large pocket piece having a top, two sides, and a bottom, and being attached to the second planar surface to form a large pocket with an upper opening, wherein the bottom of the large pocket piece is attached to the second planar surface by means of hook and loop fasteners to releasably hold the bottom of the large pocket piece to the second planar surface to allow debris to escape from the large pocket formed by the large pocket piece, and (d) a means of attachment of the accessory holder to a support.

2. The accessory holder of claim 1, wherein the means of attachment comprises a plurality of grommets along each of the side edges and a grommet along the top end edge.

3. The accessory holder of claim 1, further comprising two cross-pockets for insertion of a stiffening rod and a dowel or other sturdy elongated support piece for insertion in the cross-pockets.

4. The accessory holder of claim 1, further comprising a loop attached to one of the planar surfaces.

5. The accessory holder of claim 1, further comprising a large pocket between the large pocket piece and the second planar surface for holding a stiffening board.

* * * * *